(12) United States Patent
Reyhanloo

(10) Patent No.: US 9,186,017 B2
(45) Date of Patent: Nov. 17, 2015

(54) BREWING DEVICE FOR CREATING A COFFEE BEVERAGE AND METHOD FOR CREATING A COFFEE BEVERAGE

(71) Applicant: Jura Elektroapparate AG, Niederbuchsiten (CH)

(72) Inventor: Shahryar Reyhanloo, Immensee (CH)

(73) Assignee: Jura Elektroapparate AG, Niederbuchsiten (CH)

(*) Notice: Subject to any disclaimer, the term of this patent is extended or adjusted under 35 U.S.C. 154(b) by 89 days.

(21) Appl. No.: 13/913,972

(22) Filed: Jun. 10, 2013

(65) Prior Publication Data

US 2013/0295244 A1    Nov. 7, 2013

Related U.S. Application Data

(63) Continuation of application No. PCT/CH2011/000307, filed on Dec. 22, 2011.

(30) Foreign Application Priority Data

Dec. 23, 2010    (EP) .................................... 10405246

(51) Int. Cl.
*A47J 31/36* (2006.01)
*A23F 5/26* (2006.01)
(Continued)

(52) U.S. Cl.
CPC ................. *A47J 31/36* (2013.01); *A23F 5/267* (2013.01); *A47J 31/34* (2013.01); *A47J 31/4496* (2013.01); *A47J 31/46* (2013.01)

(58) Field of Classification Search
CPC ....... A47J 31/34; A47J 31/36; A47J 31/4496; A47J 31/46; A23F 5/267
See application file for complete search history.

(56) References Cited

U.S. PATENT DOCUMENTS 5,259,296 A    11/1993    Mikael et al.
5,622,099 A    4/1997    Frei
(Continued)

FOREIGN PATENT DOCUMENTS

DE    33 16 157 A1    11/1984
DE    42 40 175 C1    12/1993
(Continued)

OTHER PUBLICATIONS

International Preliminary Report on Patentability for Application No. PCT/CH2011/000307; dated Apr. 18, 2013.
(Continued)

*Primary Examiner* — Anthony Weier
(74) *Attorney, Agent, or Firm* — Alston & Bird LLP

(57) ABSTRACT

The brewing device for creating a coffee beverage has a brewing unit having a brewing chamber, a crema unit having a crema chamber connected to the brewing chamber by means of a coffee passage and having a valve piston for opening and/or closing the coffee passage, which valve piston can be moved in the crema chamber relative to the coffee passage, and an outlet opening. The valve piston can be moved into a plurality of different specified movement positions relative to the coffee passage, wherein different consecutive brewing processes for creating different coffee beverages can be realized, and wherein the crema unit is designed in such a way that coffee brewed during a particular brewing process can be swirled through at different intensity than a different brewing process depending on the particular specified movement position of the valve piston.

12 Claims, 5 Drawing Sheets

(51) Int. Cl.
   *A47J 31/34* (2006.01)
   *A47J 31/44* (2006.01)
   *A47J 31/46* (2006.01)

(56) References Cited

U.S. PATENT DOCUMENTS

| | | | |
|---|---|---|---|
| 5,638,740 A * | 6/1997 | Cai | ............... 99/295 |
| 6,412,394 B2 | 7/2002 | Bonanno | |
| 8,397,627 B2 | 3/2013 | Reyhanloo | |
| 2004/0107841 A1 | 6/2004 | Cai | |
| 2006/0117960 A1 * | 6/2006 | Fischer | ............ 99/279 |
| 2007/0012194 A1 | 1/2007 | Oehninger | |
| 2010/0080877 A1 * | 4/2010 | Reyhanloo | ............ 426/433 |

FOREIGN PATENT DOCUMENTS

| | | |
|---|---|---|
| DE | 20 2005 011204 U1 | 9/2005 |
| EP | 0 559 620 B1 | 9/1993 |
| EP | 0 756 842 A1 | 2/1997 |
| EP | 1 125 535 A2 | 8/2001 |
| EP | 2 168 465 A | 3/2010 |
| GB | 2273864 A | 7/1994 |
| WO | WO-00/07488 A1 | 2/2000 |
| WO | WO 01/24670  * | 4/2001 |

OTHER PUBLICATIONS

Request for international preliminary examination for Application No. PCT/CH2011/000307; dated Oct. 23, 2012.

Request for international preliminary examination—Telephone discussion of 11$^{th}$ Apr. 2013 for Application No. PCT/CH2011/000307; dated Apr. 2013.

International Search Report for Application No. PCT/CH2011/000307, dated Apr. 24, 2012.

* cited by examiner

BREWING DEVICE FOR CREATING A COFFEE BEVERAGE AND METHOD FOR CREATING A COFFEE BEVERAGE

CROSS-REFERENCE TO RELATED APPLICATIONS

This application is a continuation of International Application No. PCT/CH2011/000307, filed Dec. 22, 2011, which claims priority to EP Application No. 10405246.9, filed Dec. 23, 2010, the entire contents of which are incorporated herein by reference.

TECHNOLOGICAL FIELD

The present invention relates to a brewing device for creating a coffee beverage having a crema unit arranged in a coffee outlet, with which a crema can be created. The invention further relates to a method for creating a coffee beverage with such a brewing device.

In particular the invention relates to a brewing device having a specially configured crema unit by means of which it is possible to vary the amount of crema created per brewing operation.

BACKGROUND

A brewing device with the option to increase the amount of crema created during the brewing operation is known, for example, from the EP 2 168 465 A1. The brewing device described in there is equipped with a so-called crema valve which is arranged between the brewing unit and the coffee outlet and which limits the outflow of the coffee brewed in the brewing device into the coffee outlet pipe by means of a compression-spring-loaded stopper. Due to the fact that the brewed coffee is pressed under pressure in direction of the stopper, the compression spring—provided the brewing water pressure is sufficiently high—exposes an annular gap through which the brewed coffee can flow into the output pipe. Due to the fact that this annular gap is of limited size turbulences are created as the brewed coffee passes through. This swirling through of the brewed coffee causes a fine-pored foam to be created which is called crema.

In order to be able to increase the quantity of crema produced in this way, the conventional brewing device comprises a gas injector with which gas at variable pressure and in variable amounts can be introduced into the crema chamber. Due to this additional swirling through of the coffee within the crema chamber, i.e. after passing through the annular gap, the amount of crema produced in the conventional brewing device is increased. Therefore, whilst it is possible by means of the conventional brewing device to artificially increase the amount of the classically produced crema by introducing a gas into the crema chamber, no provision is made for decreasing the amount of the particular produced crema to a minimum.

Moreover due to the regionally very different coffee cultures and the resulting different drinks of coffee such as Cappuccino, Latte Macchiato, Espresso, different personal tastes exist, wherein there is also a desire as regards the amount and the pore size of the crema to produce less or larger-pore crema, going as far as coffee beverages to be output by the brewing device, which have no crema layer whatsoever.

Due to the use of a compression-spring-loaded valve in the conventional brewing device there is also a danger for drink residues to accumulate in the valve so that this compression-spring-loaded valve gets clogged up to an extent where a smooth operation of the valve is impaired. A compression-spring-loaded valve may under certain circumstances resist the increased pressure of the brewing water before it exposes the annular gap for the passage of the brewed coffee beverage. Whilst this may cause a change in the consistency of the crema, such clogging up in the worst case leads to the valve suddenly releasing under sufficiently high brewing water pressure and explosively opening against the restoring force of the spring. Due to the equally sudden emergence of the coffee in the coffee spout it may therefore happen for example that the coffee sprays out of the spout under excessively initial pressure, resulting in an unsatisfactory coffee beverage.

A further disadvantage of the conventional brewing device consists in that due to the spring-loaded crema valve during standstill of the brewing device, i.e. for example following a completed brewing operation, any coffee water remaining in the coffee outlet pipe builds up behind the crema valve and cannot return into the brewing chamber. When subsequently another brewing operation is performed this residual liquid is initially output at the coffee outlet before the freshly brewed coffee reaches the coffee outlet. In case of a prolonged standstill between consecutive brewing operations it is then possible that this residual liquid has cooled down to such an extent that this has a negative effect upon the temperature of the output coffee beverage.

SUMMARY

The present invention is based on the requirement to avoid the mentioned disadvantages and to propose a brewing device for producing a coffee beverage as well as a method which make it possible to vary the amount of the respectively produced crema over a wide range and to avoid an explosive opening of the crema valve. In addition the temperature of the output coffee shall remain substantially constant even for a prolonged standstill of the brewing device.

This requirement is met by a brewing device with the characteristics of patent claim 1 and a method with the characteristics of patent claim 8. The brewing device according to the invention for producing a coffee beverage comprises a brewing unit with a brewing chamber for brewing coffee with brewing water which can be introduced into the brewing chamber under pressure, a crema unit for producing a crema with a crema chamber connected with the brewing chamber via a coffee passage and a valve piston movable in the crema chamber relative to the coffee passage for opening and/or closing the coffee passage and an outlet opening for the particular coffee beverage, wherein the crema chamber of the crema unit is connected with the outlet opening by means of an outlet line such that, for producing the respective coffee beverage, coffee brewed in the brewing unit can flow through the coffee passage and the crema chamber and can reach the outlet opening.

The valve piston can be moved in such a way that a movement position of the valve piston can be altered relative to the coffee passage and can be brought into a plurality of different specified movement positions so that in one of the specified movement positions the valve piston tightly closes the coffee passage and in another of the specified movement positions is at a distance from the coffee passage and does not close the coffee passage, wherein different consecutive brewing operations for producing different coffee beverages can be realised in such a way that, for one of the particular brewing operations, the valve piston assumes a specified movement position different than the specified movement position for a different brewing operation, and wherein the crema unit is designed such that the coffee brewed in the crema chamber during the particular brewing operation can be swirled through at different intensity depending on the particular specified movement position of the valve piston.

According to the invention the brewing device comprises: a final control element which is configured, according to a control signal, to alter the movement position of the valve piston and/or to move the valve piston into one of the specified movement positions; a pressure sensor for providing a pressure reading for the momentary pressure of the brewing water in the brewing chamber and a control unit which is configured to produce the control signal and to supply it to the final control element. The control unit is implemented as a regulator which is configured to receive the pressure reading provided by the pressure sensor and to regulate, during one of the brewing operations, the movement position of the valve piston depending on a pressure setpoint for the pressure of the brewing water in the brewing chamber such that the pressure of the brewing water in the brewing chamber assumes the pressure setpoint.

A first specified movement position of the valve piston may, for example, be chosen such that the valve piston tightly closes the coffee passage thereby preventing liquids from flowing from the brewing chamber into the crema chamber.

In this case brewing water can, for example, be directed into the brewing chamber and placed under pressure so that coffee can be brewed in the brewing chamber at a relatively high pressure of the brewing water. In this case the brewing device allows, for example, the preparation of a coffee beverage in the form of espresso. Further specified movement positions of the valve piston may be chosen such that the valve piston assumes different specified distances from an opening of the coffee passage into the crema chamber.

The brewing device allows the valve piston to be positioned at respectively different specified movement positions for different consecutive brewing operations (for producing different coffee beverages) or to move the valve piston during the brewing operation between different specified movement positions. The particular movement position which the valve piston assumes during a brewing operation influences the amount of pressure of the brewing water in the brewing chamber (in the following called "brewing water pressure") during the brewing operation and the speed with which the coffee brewed in the brewing chamber flows through the coffee passage into the crema chamber and subsequently through the outlet line, and thus also the flow rate of the brewed coffee in the coffee passage or the outlet line.

Due to the fact that the movement path of the valve piston, i.e. by analogy the insertion depth of the valve piston into the crema chamber and further the contact pressure of the valve piston against the coffee passage, can be varied, the intensity with which the coffee pressed through the coffee passage is swirled through, can be varied relative to a brewing operation of the coffee beverage. By varying the intensity of swirling it is possible to vary the amount and the pore size of the crema over a wide range.

If, for example, the particular movement position of the valve piston during the brewing operation is chosen such that the coffee in the brewing chamber is brewed at a relatively high brewing water pressure and flows into the crema chamber at a relatively high speed, the brewed coffee is swirled through in the crema chamber at a relatively high intensity with the result that a coffee beverage (e.g. espresso) is created with a relatively large amount of crema on the coffee beverage. If, on the other hand, the particular movement position of the valve piston during the brewing operation is chosen such that the coffee in the brewing chamber is brewed at a relatively low brewing water pressure and flows into the crema chamber at a relatively low speed, the brewed coffee in the crema chamber is swirled through at relatively low intensity or not at all with the result that a coffee beverage without crema (e.g. a coffee beverage with the consistency of filter coffee) or a coffee beverage with a relatively small amount of crema on the coffee beverage is created. Accordingly the brewing device according to the invention can be used to produce different coffee beverages of varying consistency and with varying amounts of crema on the particular coffee beverage.

A further advantage of the solution according to the invention compared to the conventional state-of-the-art brewing device is seen in the fact that due to moving or displacing the valve piston in a variable manner—i.e. without being dependent (as is usual with conventional brewing devices) on the interaction between a brewing water pressure acting on the valve piston and a restoring force of a spring acting on the valve piston—it is possible to open the coffee passage even after a completed brewing operation, so that any residual liquid in the crema chamber or the outlet line after the brewing operation can flow back into the brewing chamber. This residual liquid can be subsequently directed into a residual water reservoir such as a drip tray. In this way it is prevented that the temperature of the coffee output with the next brewing operation is reduced.

Finally it is advantageous that due to moving or displacing the valve piston in a controlled manner a sudden retraction of the valve can be avoided, even if the valve is clogged up by coffee residues, for example.

The brewing device according to the invention is characterised in that the brewing device further comprises a control unit and a final control element. The final control element is coupled with the movable valve piston and suitable for altering the movement position or insertion depth of the same in the crema chamber. The final control element receives a control signal from the control unit, wherein the control signal issued by the control unit corresponds, for example, to the targeted position of the valve piston, i.e. one of the specified movement positions of the valve piston. In this way it is possible to vary the consistency of the crema produced over a wide range and particularly finely.

Furthermore provision is made for the control unit to be designed as a regulator and for the brewing device to further comprise a setpoint-setting unit and a sensor. The sensor records a measured variable and supplies it to the regulator as a measurement signal, wherein the regulator is configured such that a setpoint specified by the setpoint-setting unit is obtained by moving or displacing the valve piston.

Furthermore, with the configuration as a regulator, it is possible to specify not a static setpoint but a setpoint progression over time. In this way it is possible to vary the consistency of the produced crema over a wide range.

The sensor may be configured, for example, as a pressure sensor, which via an appropriate arrangement records the pressure within the brewing chamber. By means of an appropriate configuration of the regulator which receives a pressure reading from such a pressure sensor, it is possible to regulate the displacement path of the valve piston such that for example a specified static pressure which is specified in form of a static pressure setpoint over time, develops within the brewing chamber. Alternatively it is, of course, possible to specify a pressure setpoint which is variable over time as the brewing operation progresses, so that a pressure gradient is passed through during the brewing operation with the aid of the regulator.

The particular advantage in this case consists in that the momentary pressure of the brewing water in the brewing chamber but also the momentary movement position of the valve piston can be very precisely measured by means of the different sensors, which for a corresponding specified setpoint ensures an extremely well reproducible consistency of the crema on the particular output coffee beverage.

The final control element may, for example, be designed as an electro-mechanical drive (e.g. as a step motor), which allows an especially simple control in respect of the movement position of the valve piston.

Furthermore provision is made for the crema unit and the final control element to be arranged in a brewing piston of the brewing device with the special advantage that the total volume of the brewing device is not enlarged by the design according to the invention in comparison to a conventional device.

Alternatively the crema unit together with the final control element may be designed as a separate assembly which may be arranged spatially separate from the brewing unit. In this case the crema unit may be connected with the brewing unit by means of a pipeline or a tube. For this purpose the distance between an outlet opening of the brewing chamber for the respectively brewed coffee and the coffee passage of the crema chamber may be bridged by the respective pipeline or the respective tube so that respectively brewed coffee can flow from the brewing chamber via the respective pipeline or the respective tube into the crema chamber. The outlet opening of the brewing chamber may for example be formed in the brewing piston, and one end of the respective pipeline or the respective tube may be attached to the brewing piston. Due to the fact that the crema unit together with the final control element is designed as a separate assembly, the crema unit may be positioned (randomly) independently of the brewing unit. The advantage is that the crema unit can be retrofitted to already existing brewing units, even if there is insufficient space in the brewing unit for integrating the crema unit and the final control element with it.

It has been provided and is possible, that the setpoint which is produced by means of the setpoint-setting unit, is specified by a stored crema profile. In a coffee machine receiving the brewing device according to the invention this profile may be integrated, for example, with the automatic control system and be associated with a crema of predetermined characteristics. By choosing the corresponding profile it is thus possible for the output coffee beverage to form a crema on the basis of the automatically set setpoint value, which crema then has certain desired properties. This makes it possible in a particularly advantageous manner, for example according to user preference, to automatically alter the amount and/or characteristics of the crema (e.g. consistency and/or taste of the crema) from one brewing operation to another over a wide range.

As a rule provision is made for a coffee sieve to be arranged between the crema unit and the brewing chamber at or in the coffee passage, which prevents the ground coffee from passing into the crema chamber. According to the invention this coffee sieve can be rinsed by means of the liquid flowing back into the brewing chamber at the end of the brewing operation and after moving the valve piston into a position which enables the liquid remaining in the outlet line to flow back into the brewing chamber, so that the coffee residue remaining in this coffee sieve after a brewing operation is very small.

BRIEF DESCRIPTION OF THE DRAWINGS

Exemplary embodiments of the brewing device according to the invention for producing a coffee beverage and of the method according to the invention will now be explained in detail by means of a drawing, in which.

DETAILED DESCRIPTION

Figure 1:
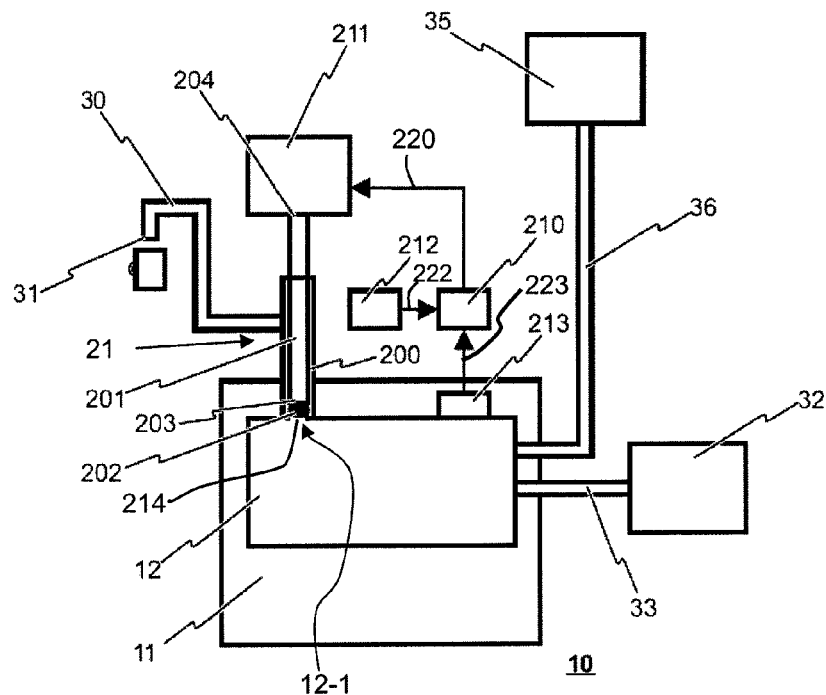
FIG. 1 shows a schematic illustration of a brewing device according to the invention with a brewing unit and a crema unit.

FIG. 1 shows a schematic illustration of a brewing device 10 according to the invention 10 for producing a coffee beverage. In the figure the brewing device 10 includes a coffee container 35 from which coffee for example in powder form is automatically taken and supplied via a coffee feed line 36 to a brewing chamber 12 of a brewing unit 11. The brewing chamber 12 of the brewing unit 11 is further connected via a water feed line 33 with a water tank 32, which looks after the fresh water supply. The brewing chamber 12 further comprises an outlet opening 12-1 for the particular brewed coffee. At the outlet opening 12-1 of the brewing chamber 12 a crema unit 21 is arranged which encompasses a crema chamber 200 and a valve piston 201 protruding into the crema chamber 200. The valve piston 201 encompasses a stopper 202 which is arranged at an end of the valve piston 201 facing the brewing chamber 12. The valve piston 201 is configured such that it can be moved in its longitudinal direction while being positioned in a plurality of different specified positions (called "movement positions" in the following).

In one of the specified positions (as indicated in FIG. 1) the stopper 202 closes a coffee passage 214 which connects the brewing chamber 12 with the crema chamber 200, with the coffee passage 214 leading into the brewing chamber 12 at the outlet opening 12-1. In its longitudinal direction furthermore the valve piston 201 can be moved in a direction facing away from the brewing chamber 12 (upwards in FIG. 1), so that the valve piston 201 is able to assume one or more other specified movement positions (not shown in FIG. 1) in which the valve piston 201 is arranged at a distance from the coffee passage 214, so that the stopper 202 no longer closes the coffee passage 214 and brewed coffee from the brewing chamber 12 can flow as required into the crema chamber 200. The brewed coffee, after being swirled through as required, flows into the crema chamber 200 and in there, in an upper area, is directed through an outlet line 30 to an outlet opening 31. The valve piston 201 can be moved by means of a final control element 211 such that its insertion depth into the crema chamber 200 can be varied within wide limits.

The stopper 202, for example, may consist of rubber or a comparable elastic material and serves to vary a contact pressure towards the lower chamber end of the crema chamber 200 by means of the final control element 211. In this way a gap which forms between the stopper 202 and the coffee passage 214 when the valve piston 201 is removed from the movement position shown in FIG. 1 for letting coffee through from the brewing chamber 12 into the crema chamber 200 by varying the contact pressure or possibly by lifting the valve piston 201 further, can be altered such that the brewed coffee entering into the crema chamber 200 through this gap comprises a crema which as regards its condition (for example consistency or taste) and/or the amount of particular crema produced is variable (changeable) (depending on the particular movement position of the valve piston 201). By moving the valve piston 201 in direction of its end 204 on the side of the final control element the amount of crema produced can be reduced to a minimum.

In the embodiment shown a sensor 213 configured as a pressure sensor is attached to the brewing chamber 12, which measures the momentary water pressure of the brewing water within the brewing chamber 12 during a brewing operation. A measuring signal 223 recorded in this way is directed to a control unit 210 configured as a regulator which in turn is supplied with a default signal 222 by a setpoint-setting unit 212. The setpoint-setting unit 212 may specify a regulating variable such as a pressure to be maintained or a movement position of the valve piston 201 corresponding to the pressure to be maintained, which translates the control unit 210 configured as a regulator into a control signal 220. This control signal 220 is then fed to the final control element 211, wherein the final control element 211 is, as a rule, configured as a motor, preferably a step motor.

Figure 2:
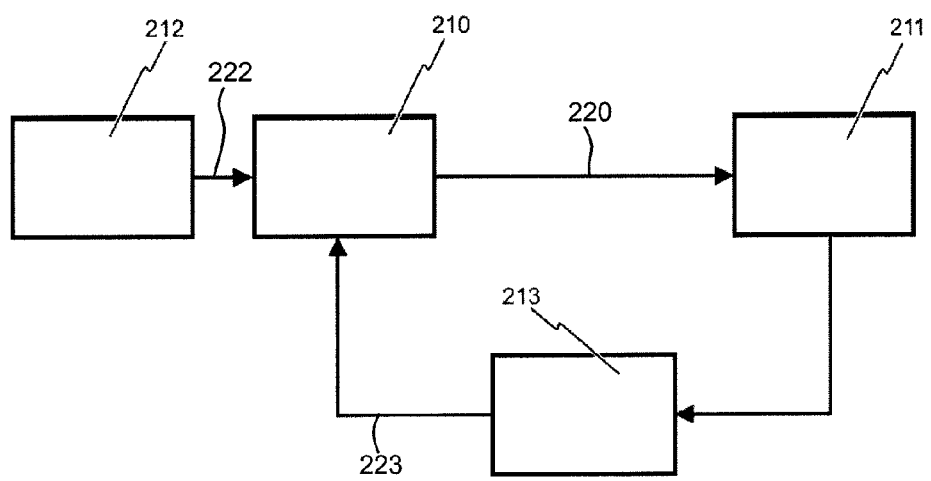
FIG. 2 shows a schematic circuit diagram of the measuring, controlling and regulating components of the device according to the invention.

As is evident from the block circuit diagram in FIG. 2, the control unit 210, the final control element 211, the setpoint-setting unit 212 as well as the sensor 213 are interconnected to form a control loop which can be implemented in a simple way. Alternatively it is of course possible to provide not a regulating operation but merely a controlling operation. In this case, it would be suitable to refrain from using the sensor 213 shown in FIG. 2. In this case, if the final control element 211 is implemented as a step motor for example, the setpoint specified by means of the setpoint-setting unit 212 could, for example, include the number of steps to be performed by the step motor.

Figure 3:
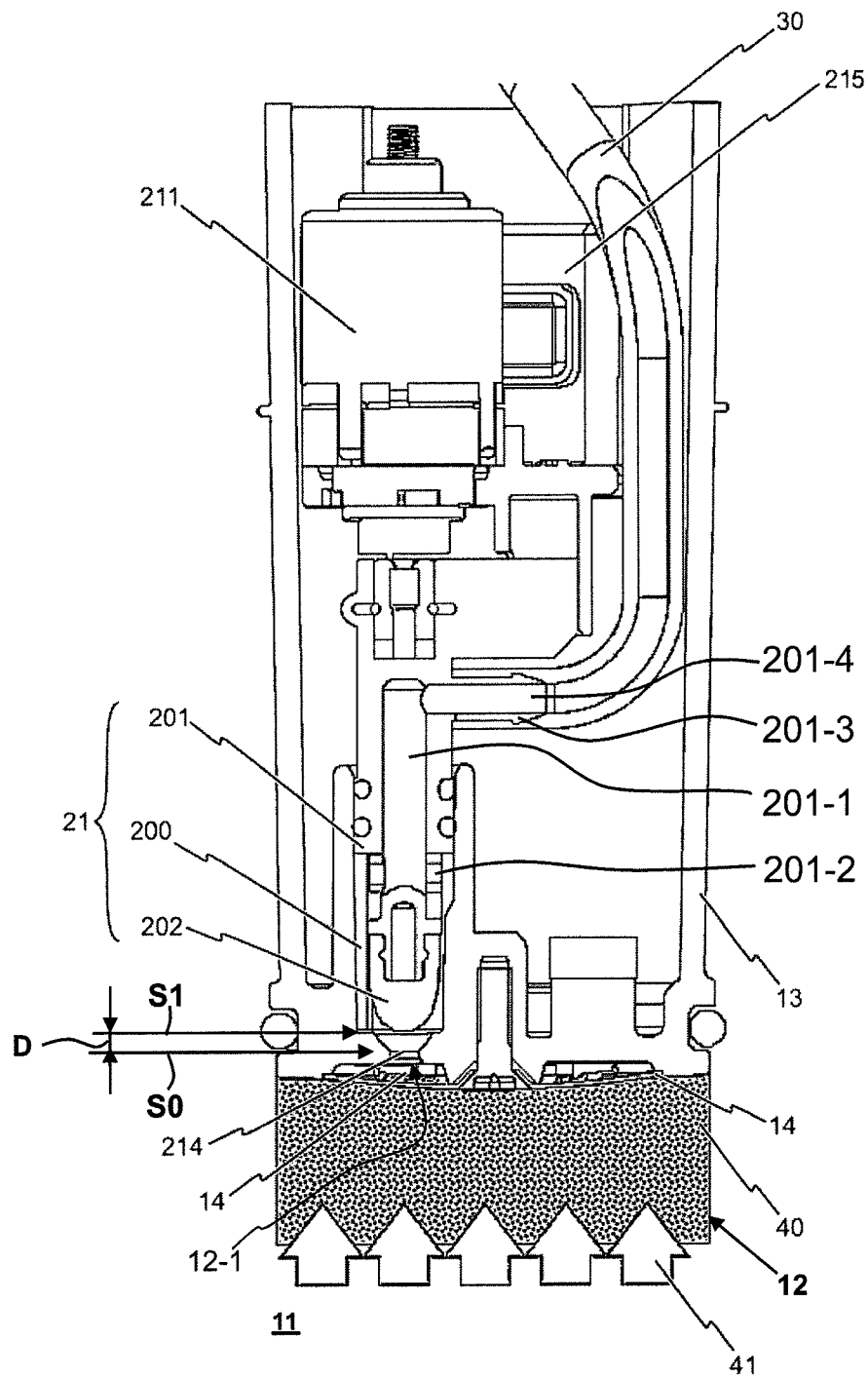
FIG. 3 shows a lateral sectional view of the brewing unit according to FIG. 1 with a crema unit and a step motor.

FIG. 3 shows a sectional view of the brewing unit 11, wherein it can be seen that both the crema unit 21 and the final control element 211 configured as a step motor are housed entirely within the brewing piston 13. The final control element 211 in this case is fastened by means of a fastening device 215 within the brewing unit 11 thereby ensuring reliable lifting and lowering of the valve piston 201. As also revealed in FIG. 3, a coffee sieve 14 is formed on the coffee passage 214 to which counter-pressure can be applied with the aid of the valve piston 201 and the stopper 202. The coffee sieve is provided for the purpose of retaining the compressed coffee powder 40 within the brewing chamber 12 and to allow only the liquid components, i.e. the brewed coffee, to pass in the direction of the coffee passage 214.

In FIG. 3 the valve piston 201 is shown in a situation in which the stopper 202 is arranged at a distance D from the coffee passage 214 (movement position S1 of valve piston 201), so that the coffee passage 214 is not closed by the valve piston 201 and thus exposed to the passage of the coffee brewed in the brewing chamber 12. If, however, the valve piston 201 is moved into the movement position SO shown in FIG. 3, the stopper 202 closes the coffee passage 214.

As indicated in FIG. 3 the valve piston 201 comprises a central longitudinal bore 201-1 and encompasses at least one connecting channel 201-2 which realises a fluid connection between the crema chamber 200 and the central longitudinal bore 201-1, and a connecting piece 201-3 which has one end of the outlet line 30 attached to it, wherein the connecting piece 201-3 comprises a bore 201-4, which realises a fluid connection between the central longitudinal bore 201-1 and the outlet line 30.

The pressurised brewing water initially flows in direction of the sieve 14, wherein the flow direction of this pressurised brewing water is indicated by an arrow marked with the reference symbol 41. During the brewing operation the brewed coffee or the brewing water passes through the coffee sieve 14 and the coffee passage 214 into the crema chamber 200 while being swirled through with differing intensity, depending on the movement path of the valve piston 201 and, as required, the counter-pressure from the stopper 202. Accordingly the coffee beverage entering (through the connecting channel 201-2 and the bores 201-1 and 201-4) into the outlet line 30 configured as a tube comprises a crema of greater or lesser intensity and variable consistency (depending on the movement position which the valve piston 201 assumes during the brewing operation).

Figure 4:
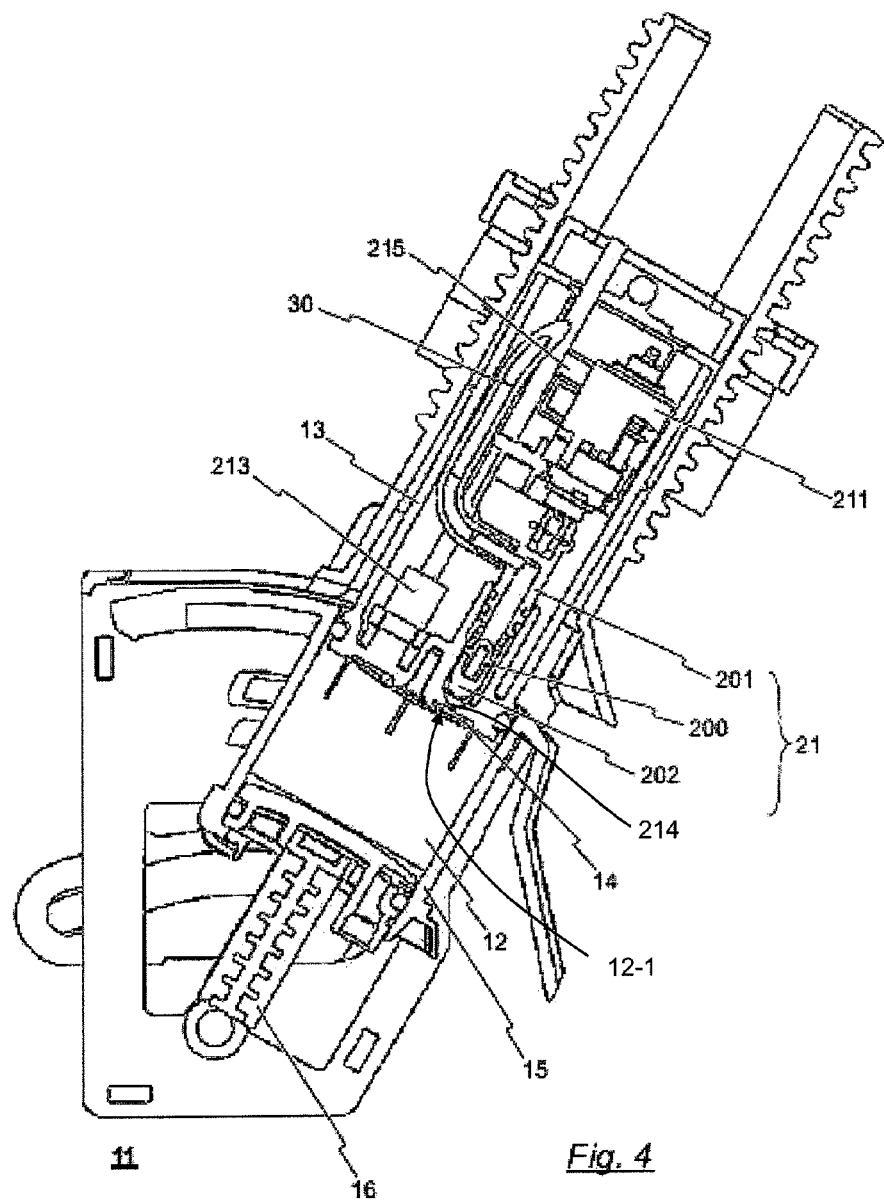
FIG. 4 shows a further lateral sectional view of a brewing unit according to FIG. 1 with crema unit and pressure sensor.

Further as revealed in the sectional view of FIG. 4, the brewing unit 11 is installed in a swivelling unit which, by means of swivelling the brewing cylinder 15 and by means of moving the brewing piston 13 (in longitudinal direction of the brewing piston 13) and by moving the ejecting piston 16 (in longitudinal direction of the ejecting piston 16), permits automatic filling of the brewing chamber 12 with coffee powder prior to the brewing operation and subsequent emptying of the brewing chamber 12 following the completed brewing operation (including removing the coffee powder and, as required and if present, the remains of the brewing water from the brewing chamber 12). Such swivelling also causes swivelling of the outlet line 30 relative to the coffee outlet 31 not shown in FIG. 4. The above-mentioned automatic filling and emptying of the brewing chamber 12 is known as such, e.g. from EP 0 559 620 B1 and will therefore not be explained in detail here. By means of the solution according to the invention it is therefore possible, following the brewing operation, to determine the position of the piston 201 such that the remaining residual liquid flows back from the outlet line 30 through the coffee passage 214 into the brewing chamber 12 and from there into a drip tray or similar catchment device. This has the effect of preventing any residual water in the outlet line 30 from being sprayed out of the outlet opening 31 during swivelling of the brewing cylinder 15, for example during automatic filling or emptying of the brewing chamber 12.

As further revealed in FIG. 4 a sensor 213 configured as a pressure sensor is provided for measuring the brewing water pressure during a brewing operation, which pressure acts upon the brewing piston 13. This pressure sensor 213 is connected with a control unit 210 not shown in FIG. 4, which in turn is configured as a regulator and which issues a control signal 220 again not shown in FIG. 4 to the final control element 211, i.e. a step motor in FIG. 4.

Figure 5:
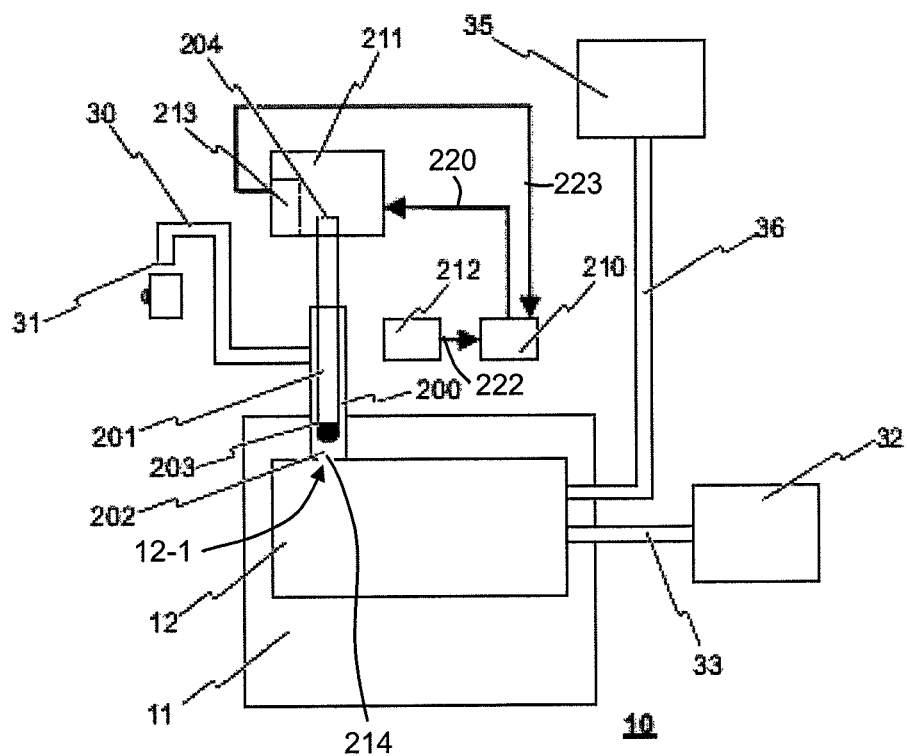
FIG. 5 shows a schematic illustration of a brewing device not according to the invention similar to FIG. 1, but with a sensor configured as a position sensor and integrated with the final control element and a valve piston partially moved out of the crema unit.

FIG. 5 finally represents a schematic illustration of a brewing device 10 similar to that in FIG. 1, wherein in this case the sensor 213 is configured, not as a pressure sensor but as a position sensor. FIG. 5 shows that this position sensor is integrated with a housing of the final control element 211. The position sensor can thus determine e.g. the movement position or the insertion depth of the valve piston 201 and issue a measurement signal 223 to the control unit 210 configured as a regulator. In FIG. 5 the valve piston 201 is schematically shown as being displaced or moved into a position in which compared to the illustration in FIG. 1 less or no crema at all is produced.

Figure 6:
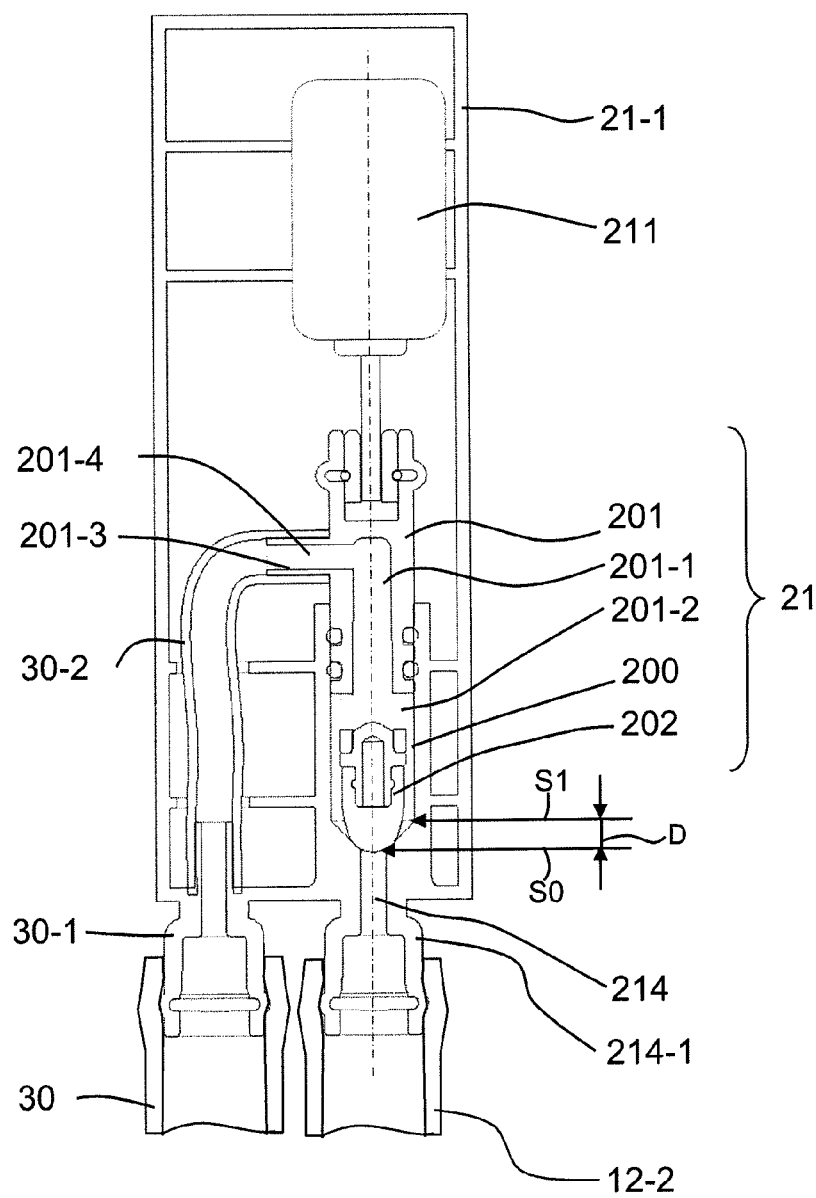
FIG. 6 shows a schematic illustration of the crema unit according to FIG. 1 and a final control element which together form a separate assembly, which can be arranged spatially separate from the brewing unit of the brewing device.

FIG. 6 shows an assembly 21A comprising a crema unit 21 and a final control element 211, wherein the crema unit 21 or the final control element 211 correspond to the brewing device shown in FIG. 1 to FIG. 5 as regards construction and function of the crema unit 21 or the final control element 211. In FIG. 1 to FIG. 6 identical or similarly functioning parts are marked with the same reference symbols. The arrangement of the crema unit 21 and the final control element 211 in the assembly 21A of FIG. 6 is different from the arrangement of the crema unit 21 and the final control element 211 shown in FIG. 3 and FIG. 4 in that the assembly 21A can be positioned independently of the brewing unit 11, wherein the respective distance to the brewing chamber 12 can be chosen at random. In deviating from the construction of the brewing unit shown in FIG. 1 to FIG. 5 the crema unit 21 and the final control element 211 may be arranged outside the brewing piston 13 of the brewing unit 10. In the present example the assembly 21A encompasses a housing 21-1, in which the crema unit 21 and the final control element 211 are arranged. In this variant the assembly 21A forms a unit which as a whole can be positioned at a predetermined location.

As indicated in FIG. 6 the assembly 21A comprises a connecting piece 214-1, which is arranged on the outside of the housing, and in which a coffee passage 214 leading into the crema chamber 200 is formed (corresponding to coffee passage 214 of FIGS. 1 and 3-5). One end of the tube 12-2 can be connected to the connecting piece 214-1, whilst the other end (not shown in FIG. 6) can be connected to the brewing unit 11 in order to establish a connection between the brewing chamber 12 and the crema chamber 200 enabling coffee brewed in the brewing chamber 200 to flow via the tube 12-2 into the coffee passage 214.

The assembly 21A of FIG. 6 could, for example, replace the crema unit 21 and the final control element 211 in the brewing unit 11 as shown in FIG. 3 and FIG. 4, wherein merely the coffee passage 214 of the assembly 21A would have to be connected via the tube 12-2 with the outlet opening 12-1 of the brewing chamber 12. Instead of the tube 12-2 another suitable line, for example a pipeline, can of course be used.

In FIG. 6 the valve piston 201 is depicted in a situation, in which the stopper 202 is arranged in the movement position SO, thereby closing the coffee passage 214. The valve piston 201 is movable in its longitudinal direction by means of the final control element 211, for example into the movement position S1 shown in FIG. 6, in which the stopper 202 does not close the coffee passage 214, thereby establishing a fluid connection between the coffee passage 214 and the bore 201-4 via the crema chamber 200, the connecting channel 201-2 and the central longitudinal bore 201-1.

As also indicated in FIG. 6, the assembly 12A comprises a connecting piece 30-1 with a longitudinal through-bore which is arranged on the housing 21-1 and serves to establish a fluid connection between the bore 201-4 and the outlet line 30 for the particular produced coffee beverage. As indicated in FIG. 6 the connecting piece 30-1 comprises two ends for this purpose, wherein one of these ends is connectable with one end of the outlet line 30 and the other end of the connecting piece 30-1 is connected via a tube 30-2 with the connecting piece 201-3 of the valve piston 201, so that the particular produced coffee beverage can flow from the crema chamber 200 via the tube 30-2 into the outlet line 30.

That which is claimed is:

1. A brewing device for producing a coffee beverage, wherein the brewing device comprises:

a brewing unit with a brewing chamber for brewing coffee with brewing water which can be introduced under pressure into the brewing chamber;

a crema unit for creating crema with a crema chamber connected with the brewing chamber via a coffee passage and a valve piston movable in the crema chamber relative to the coffee passage for opening and/or closing the coffee passage; and an outlet opening for a particular coffee beverage, wherein the crema chamber of the crema unit is connected with the outlet opening by means of an outlet line such that for producing the particular coffee beverage coffee brewed in the brewing unit during a brewing operation is enabled to flow through the coffee passage and the crema chamber and reach the outlet opening, wherein the valve piston is movable such that a movement position of the valve piston is enabled to be altered relative to the coffee passage and the valve piston is configured to be brought into a plurality of different specified movement positions, so that the valve piston in one of the specified movement positions tightly closes the coffee passage and in another of the specified movement positions is at a distance from the coffee passage and does not close the coffee passage, wherein different consecutive brewing operations for producing different coffee beverages can be realized such that the valve piston assumes one of the specified movement positions in one of the brewing operations and another one of the specified movement positions in another one of the brewing operations, and wherein the crema unit is configured such that the coffee brewed during the respective brewing operation is configured to be swirled through the crema chamber at different intensity depending on the respective specified movement position of the valve piston, whereby a final control element which is configured, according to a control signal, to alter the movement position of the valve piston;

a pressure sensor for providing a pressure reading for the momentary pressure of the brewing water in the brewing chamber;

a control unit which is configured to produce the control signal and supply it to the final control element, wherein the control unit is implemented as a regulator which is configured to receive the pressure reading provided by the pressure sensor and to regulate, during one of the brewing operations, the movement position of the valve piston depending on a pressure setpoint for the pressure of the brewing water in the brewing chamber such that the pressure of the brewing water in the brewing chamber assumes the pressure setpoint.

2. The brewing device according to claim 1, wherein the brewing device comprises a setpoint-setting unit which is configured to produce the pressure setpoint and supply this to the regulator as a default signal.

3. The brewing device according to claim 2, wherein the pressure setpoint is specified by a stored profile, which is associated with a crema of predetermined characteristics.

4. The brewing device according to claim 2, wherein the pressure setpoint is a pressure setpoint static over time.

5. The brewing device according to claim 1, wherein the crema unit and the final control element are arranged in a brewing piston.

6. The brewing device according to claim 1, wherein the crema unit together with the final control element forms a separate assembly, which is spatially separate from the brewing unit, wherein an outlet opening of the brewing chamber is connected with the coffee passage of the crema unit via a pipeline or a tube.

7. The brewing device according to claim 1, wherein the final control element is configured as an electromechanical drive or step motor.

8. A method for producing a coffee beverage with a brewing device, wherein the brewing device comprises:
- a brewing unit with a brewing chamber for brewing coffee with brewing water, which can be introduced under pressure into the brewing chamber;
- a crema unit for producing a crema with a crema chamber connected with the brewing chamber via a coffee passage and a valve piston movable relative to the coffee passage for opening and/or closing the coffee passage; and
- an outlet opening for a particular coffee beverage,
- wherein the crema chamber of the crema unit is connected with the outlet opening by means of an outlet line such that for producing the particular coffee beverage coffee brewed in the brewing unit during the brewing operation is enabled to flow through the coffee passage and the crema chamber and reach the outlet opening,
- wherein the valve piston is movable such that a movement position of the valve piston is enabled to be altered relative to the coffee passage and the valve piston is configured to be brought into a plurality of different specified movement positions, so that the valve piston in one of the specified movement positions tightly closes the coffee passage and in another of the specified movement positions is at a distance from the coffee passage and does not close the coffee passage wherein the crema unit is configured such that the coffee brewed during the respective brewing operation is configured to be swirled through the crema chamber at different intensity in the crema chamber depending on the respective specified movement position of the valve piston,
- wherein the brewing device further comprises:
- a final control element which is configured, according to the control signal, to alter the movement position of the valve piston;
- a pressure sensor for providing a pressure reading for the momentary pressure of the brewing water in the brewing chamber;
- a control unit which is configured to produce the control signal and supply it to the final control element,
- wherein the control unit is implemented as a regulator which is configured to receive the pressure reading provided by the pressure sensor and, during one of the brewing operations, to regulate the movement position of the valve piston depending on a pressure setpoint for the pressure of the brewing water in the brewing chamber such that the pressure of the brewing water in the brewing chamber assumes the pressure setpoint,
- wherein for producing a first coffee beverage during realization of a first brewing operation, coffee is brewed in the brewing chamber and during realization of the first brewing operation the pressure sensor provides a first pressure reading for the momentary pressure of the brewing water in the brewing chamber, and the control unit regulates the movement position of the valve piston depending on a first pressure reading,
- wherein for producing a second coffee beverage during realization of a second brewing operation following the first brewing operation, coffee is brewed in the brewing chamber and during realization of the second brewing operation the pressure sensor provides a second pressure reading for the momentary pressure of the brewing water in the brewing chamber and the control unit regulates the movement position of the valve piston depending on the second pressure reading.

9. The method according to claim 8, wherein the brewing device further comprises a setpoint-setting unit which creates the pressure setpoint and supplies this as a default signal to the regulator, wherein the setpoint created by means of the setpoint-setting unit is specified by a stored profile, which is associated with a crema of predetermined characteristics.

10. The method according to claim 8, wherein after producing the particular coffee beverage and outputting the coffee beverage through the outlet opening, the movement position of the valve piston is set such that any liquid remaining in the outlet line and not output from the outlet opening, in particular the remains of the coffee beverage, flows back into the brewing chamber and/or is sucked back.

11. The method according to claim 10, wherein the brewing device further comprises a coffee sieve, which is provided between the crema unit and the brewing chamber at the coffee passage, and wherein the remaining liquid flows back or is returned from the outlet line through the coffee sieve.

12. The method according to claim 10, wherein the liquid which has flowed back and/or is returned into the brewing chamber, is emptied into a residual water reservoir.

* * * * *